United States Patent [19]

Schweiker et al.

[11] 3,791,655

[45] Feb. 12, 1974

[54] SOLID RUBBER GOLF BALL

[75] Inventors: George C. Schweiker, Parkersburg, W. Va.; John W. Jepson, Marion, Mass.

[73] Assignee: Acushnet Company, New Bedford, Mass.

[22] Filed: Dec. 1, 1971

[21] Appl. No.: 203,856

[52] U.S. Cl........ 273/218, 260/41.5 R, 260/41.5 A, 260/879, 273/DIG. 10
[51] Int. Cl. . A63b 37/00, C08c 11/06, C08d 11/00
[58] Field of Search.......... 260/41.5 R, 41.5 A, 879; 273/218, DIG. 10

[56] References Cited

UNITED STATES PATENTS

| | | | |
|---|---|---|---|
| 2,989,504 | 6/1961 | Little | 260/41.5 R |
| 3,153,014 | 10/1964 | Fletcher et al. | 260/41.5 R |
| 3,438,933 | 4/1969 | Bartsch | 260/879 |
| 3,502,338 | 3/1970 | Cox | 273/218 |

Primary Examiner—Allan Lieberman
Attorney, Agent, or Firm—Eyre, Mann & Lucas

[57] ABSTRACT

A solid rubber golf ball is disclosed. The golf ball is made from a composition comprising polybutadiene and an unsaturated carboxamide cross-linking said polybutadiene with hydrogen bonding.

7 Claims, No Drawings

SOLID RUBBER GOLF BALL

The present invention relates to a new and useful solid rubber golf ball. The solid rubber golf ball is made from a polybutadiene and an $\alpha, \beta$ ethylenically unsaturated carboxamide graft polymerized thereto, said polybutadiene being cross-linked by hydrogen bonding of said carboxamides.

Until recently, virtually all golf balls were made by winding a thin elastic band around a central core and covering the core so formed with a rubber composition such as balata. These golf balls are characterized by good flight characteristics, good "click" and "feel" and good distance in flight. More recently, so called solid rubber golf balls have been developed which are homogeneous golf balls of one composition or are two part golf balls with a solid core and a standard rubber cover. While these solid rubber golf balls in many ways imitate the wound golf balls, they are frequently lacking in qualities such as good click and feel and many of these golf balls will split after being struck a number of times. The applicants have discovered that a solid rubber golf ball made from polybutadiene and an unsaturated carboxamide graft polymerized thereto yields a highly desirable golf ball having good click and feel, excellent durability, and good cohesive strength.

A golf ball according to the present invention is formed from polybutadiene and an unsaturated carboxamide graft polymerized thereto. The polybutadiene of the present invention preferably has a cis 1,4 content above about 40% and best results are achieved when the cis 1,4 content of the polybutadiene is above about 90%. These polybutadienes are commercially available under trade names such as Budene from Goodyear, Ameripol CB-220 from Goodrich, Taktene from Polysar, and Cis-4 from Phillips Petroleum. If desired, the polybutadiene backbone can be polymerized from monomeric butadiene.

An unsaturated carboxamide is grafted onto the polybutadiene backbone. The unsaturated carboxamide is an $\alpha, \beta$ ethylenically unsaturated carboxamide which may be represented by the following structural formula:

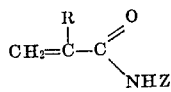

wherein R is hydrogen, or a methyl, ethyl, fluoro, chloro, or bromo group, and Z is hydrogen, or an alkyl, aryl, or heteroatom substituted alkyl or aryl group.

Suitable materials include the following carboxamides: acrylamide, methacrylamide, diacetone acrylamide, ethacrylamide, $\alpha$-fluoroacrylamide, N-phenylacrylamide, N-fluorophenylacrylamide, $\alpha$-chloroacrylamide, N-phenylmethacrylamide, N-chlorophenylacrylamide, $\alpha$-bromoacrylamide, N-bromophenylacrylamide, and N-methoxyphenylacrylamide.

The unsaturated carboxamide is preferably grafted onto the polybutadiene backbone with a free radical initiator such as dicumyl peroxide or other known free radical initiators although other suitable techniques of grafting may be employed such as heat, radioactivity, etc. The following illustrates grafting with a free radical initiator. The polybutadiene and the unsaturated carboxamide are admixed at a temperature between the glass transition temperature or melting point of the polymer and the boiling point of the unsaturated carboxamide and suitably about 200°–350°F. The mixing is continued until a cohesive mass is formed which is suitably from about 3 to 30 minutes. The temperature of the mix is then reduced to below the decomposition temperature of the free radical initiator to be employed. The free radical initiator is added and admixed at the reduced temperature, suitably for about 3–15 minutes. In the case of dicumyl peroxide, a temperature of about 150°F. is suitable. The mass is then suitably milled or cast into a slab from which pieces are cut slightly larger and heavier than the golf ball desired and placed in a standard ball cup mold. The composition in the mold is held under heat and pressure until the composition becomes hard. This will normally take between 20 and 30 minutes at a temperature from about 280° to 320°F. Thereafter the ball is removed from the mold and any "flash" formed is removed.

It is believed that the golf ball is held together as a cohesive mass by cross-linking of the hydrogen atoms of the amide group with double bonded oxygens of the carboxamide radical. The type of linking which is believed to take place may be schematically illustrated in the following manner:

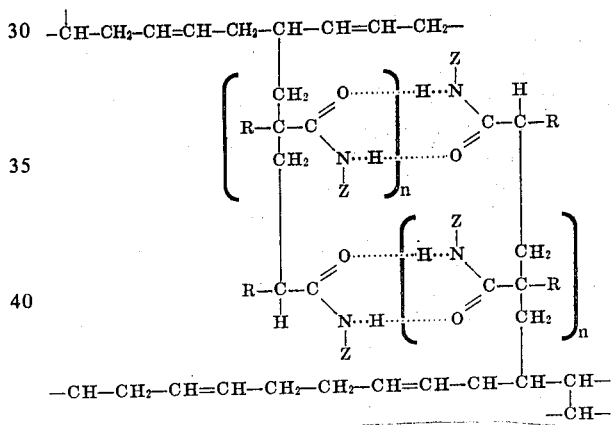

Wherein:
R is H, $CH_3$, $C_2H_5$, F, Cl, or Br;
Z is H, alkyl, aryl, or a heteroatom substituted alkyl or aryl group; and
n is a positive integer It is believed that it is this cross-linking which gives the ball not only good click but also good feel. This type of cross-linking appears to have distinct advantage in golf balls over the simple cross-linking of a polymer with a monomer as is disclosed, for example, in Bartsch U.S. Pat. No. 3,313,545.

A golf ball according to the present invention preferably comprises per 100 parts of the polybutadiene, from about 1 to about 40 parts of the unsaturated carboxamide graft polymerized thereto. Excellent results have been obtained with compositions comprising per 100 parts of polybutadiene, from about 10 to about 25 parts of acrylamide or methacrylamide. This composition may also further include per 100 parts of polybutadiene, from about 25 to about 35 parts silica as a filler and from about 1 to about 5 parts titanium dioxide as a whitening agent. In forming this composition, about 1 part antioxidant and from about 4 to about 10 parts dicumyl peroxide have been found to give excellent results.

These and other aspects of the present invention may be more fully understood with reference to the following examples.

EXAMPLE 1

The following ingredients are used:

| | |
|---|---|
| Budene 501 | 100 parts |
| Acrylamide | 10 parts |
| Antioxidant | 1 part |
| Titanox A-MO | 2 parts |
| HiSil 215 | 33 parts |
| DiCup R | 5 parts |

Budene 501 is available from Goodyear and is a polybutadiene of about 92% cis 1,4 configuration, Titanox A-MO is titanium dioxide available from National Lead Co., HiSil is a silica available from PPG Industries, Inc. and DiCup is a dicumyl peroxide available from Hercules, Inc. The Antioxidant used is American Cyanamid 2246, a 2,2'-methylene bis (4-methyl-6-tertiary butyl phenol).

The ingredients without the DiCup R are mixed on a standard two roll mixer for 10 minutes at 225°F. The mixture is cooled to 150°F., the DiCup R is added and the mixture is mixed for an additional 5 minutes. Thereafter, the composition is cast as a slab approximately one-eighth of an inch thick. A 2 inch by 1½ inch piece of the slab, weighing about 55 grams, is cut from the slab, rolled upon itself, and placed in a standard golf ball mold. The mold is closed under pressure at a temperature of about 300°F. and the composition is held under this temperature and pressure for about 30 minutes. Thereafter, the ball is removed from the mold and is allowed to secondarily cure for 24 hours at room temperature. After the secondary cure, the ball is found to have the following physical properties:

| | |
|---|---|
| PGA Compression | 38 |
| Hardness, Shore C | 71 |
| Rebound | 60 |

The ball withstands guillotine tests of both 8 and 10 pounds. When driven on a golf ball driving machine, the ball has an initial velocity of about 221 feet per second which corresponds to approximately 248 feet per second on the standard USGA testing equipment. The maximum allowable initial velocity on the USGA equipment is 250 feet per second (2% tolerance). The ball is tested as a golf ball and is found to have excellent click and feel and maintains its structural integrity despite many hits with a golf club.

EXAMPLE 2

Example 1 is repeated except that Ameripol CB-220 is substituted for the polybutadiene and the parts by weight of acrylamide is 15 parts. Ameripol CB-220 is a polybutadiene available from Goodrich, and has a cis 1,4 content of about 98%. The golf ball has the following physical properties:

| | |
|---|---|
| PGA Compression | 43 |
| Hardness, Shore C | 71 |
| Rebound | 59 |

The golf ball has an initial velocity of about 219 feet per second and is found to have excellent click and feel.

EXAMPLE 3

Example 1 is repeated except that Diene 55A is substituted for the Budene 501, 24 parts of diacetone acrylamide is used in place of the acrylamide. Diene 55A is available from Firestone Tire and Rubber Co. and is a polybutadiene composition with about 40% cis 1,4 content, 9% 1,2 content and the balance essentially trans 1,4 content. The golf ball formed from this composition is suitable for use as a golf ball, has good click and feel and has an acceptable initial velocity.

EXAMPLE 4

Example 1 is repeated except that methacrylamide is substituted for the acrylamide. An acceptable golf ball with good click and feel is obtained.

EXAMPLE 5

Example 1 is repeated except that ethacrylamide is substituted for the acrylamide. An acceptable golf ball with good click and feel is obtained.

EXAMPLE 6

Example 1 is repeated except that α-chloroacrylamide is substituted for the acrylamide. An acceptable golf ball with good click and feel is obtained.

EXAMPLE 7

Example 1 is repeated except that 24 parts of methacrylamide is substituted for the acrylamide. An acceptable golf ball with good click and feel is obtained.

The golf ball composition of the present invention may also be used in a two or more part golf ball if desired. A two part golf ball is normally formed by making a core which is approximately the same size as the core of a wound golf ball and then adding a shell cover of approximately the size used for a wound golf ball. The composition of the present invention may be used for either the core or the shell cover but best results are obtained when the composition of the present invention is used as the core.

It will be understood that the claims are intended to cover all changes and modifications of the preferred embodiments of the invention, herein chosen for the purpose of illustration, which do not constitute departures from the spirit and scope of the invention.

What is claimed is:

1. A solid unitary golf ball having good click and feel comprising a cured composition of polybutadiene having a cis 1,4 polybutadiene content of at least 40%, from 1 part to 40 parts per 100 parts of polybutadiene of αβ, ethylenically unsaturated carboxamide groups having in their monomer form the following structural formula:

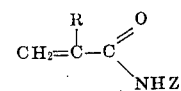

wherein:
R is hydrogen, or a methyl, ethyl, flouro, chloro or bromo group; and
Z is hydrogen, or an alkyl, aryl or heteroatom substituted alkyl or aryl group;
at least some of said carboxamide groups being graft polymerized to said polybutadiene the grafted carboxamide groups being attached to the polybutadiene at only one site, and further comprising a filler in sufficient amount to impart good click and feel to the ball.

2. The golf ball of claim 1 wherein the polybutadiene comprises at least 90% cis 1,4 polybutadiene.

3. The golf ball of claim 1 wherein the carboxamide is methacrylamide

4. The golf ball of claim 1 wherein the carboxamide is acrylamide.

5. The golf ball of claim 1 wherein the carboxamide is diacetone acrylamide.

6. A solid unitary golf ball having good click and feel comprising a cured composition of polybutadiene having at least a 90% cis 1,4 content and per 100 parts of polybutadiene, from about 10 to about 25 parts of a carboxamide selected from the group consisting of acrylamide and methacrylamide, said carboxamide being graft polymerized to said polybutadiene and further comprising a filler in sufficient amount to impart good click and feel to the ball.

7. The golf ball of claim 6 further including per 100 parts of polybutadiene from about 1 to about 5 parts titanium dioxide.

* * * * *